(12) United States Patent
Smathers

(10) Patent No.: US 9,381,895 B1
(45) Date of Patent: Jul. 5, 2016

(54) PARKING BRAKE SAFETY SYSTEM

(71) Applicant: Randall H. Smathers, Lake Mary, FL (US)

(72) Inventor: Randall H. Smathers, Lake Mary, FL (US)

(*) Notice: Subject to any disclaimer, the term of this patent is extended or adjusted under 35 U.S.C. 154(b) by 176 days.

(21) Appl. No.: 14/101,068

(22) Filed: Dec. 9, 2013

Related U.S. Application Data

(60) Provisional application No. 61/734,405, filed on Dec. 7, 2012, provisional application No. 61/756,127, filed on Jan. 24, 2013.

(51) Int. Cl.
*B60T 13/00* (2006.01)
*B60T 7/12* (2006.01)
*B60T 13/26* (2006.01)

(52) U.S. Cl.
CPC .. *B60T 7/12* (2013.01); *B60T 13/26* (2013.01)

(58) Field of Classification Search
CPC ........ B60K 28/12; B60K 28/10; B60R 25/08; B60T 7/10; B60T 7/12; B60T 8/1708; B60T 13/38; B60T 13/683; B60T 13/26
USPC ............ 303/6.01, 3, 6.1, 7, 8, 15, 19, 67–69, 303/118.1; 180/272, 273
See application file for complete search history.

(56) References Cited

U.S. PATENT DOCUMENTS

| | | | | |
|---|---|---|---|---|
| 6,367,888 B1* | 4/2002 | Kee | ......................... | B60R 25/08 180/287 |
| 6,758,298 B2* | 7/2004 | Eberling | ............... | B60T 17/221 180/272 |
| 7,513,576 B2* | 4/2009 | Hilberer | ................. | B60T 13/38 180/273 |
| 8,820,856 B2* | 9/2014 | Rogers | .................... | B60T 8/885 303/15 |
| 2003/0006644 A1* | 1/2003 | MacGregor | ............... | B60T 7/10 303/3 |
| 2004/0195910 A1* | 10/2004 | Aumuller | ................. | B60T 7/10 303/15 |
| 2009/0314590 A1* | 12/2009 | Dagh | ....................... | B60T 7/12 188/110 |
| 2010/0244550 A1* | 9/2010 | Hilberer | ................ | B60T 13/683 303/15 |
| 2011/0144855 A1* | 6/2011 | Herges | .................. | B60T 8/1708 701/29.1 |
| 2015/0102583 A1* | 4/2015 | Reimer | .................. | B60D 1/015 280/433 |

* cited by examiner

*Primary Examiner* — Pamela Rodriguez
(74) *Attorney, Agent, or Firm* — Allen Dyer Doppelt Milbrath et al.

(57) ABSTRACT

An air brake system is equipped with a service brakes and a parking brake. A control valve for the parking brake vents air therefrom to apply the parking brake. The system is configured to apply indications of driver presence and absence to effect automatic control of the parking brake control valve, including automatically applying the parking brake upon an indication of driver absence and preventing release of the parking brake without an indication of driver presence. The driver absence indication can include the combination open driver's door and an empty driver's seat. The driver presence indication can include authorized driver identification through entry of a code or other authorization mechanism, as well as a requirement that the service brakes be applied.

19 Claims, 4 Drawing Sheets

PARKING BRAKE SAFETY SYSTEM

CROSS-REFERENCE TO RELATED APPLICATION

This application claims the benefit of U.S. Provisional Patent Application Ser. No. 61/756,127, filed on Jan. 24, 2013 and U.S. Provisional Patent Application Ser. No. 61/734,405, filed on Dec. 7, 2012, the contents of which applications are herein incorporated by reference in their entirety.

FIELD OF THE INVENTION

The present invention relates to vehicles with air-operated parking brakes, and more particularly, to the operating systems for such brakes.

BACKGROUND OF THE INVENTION

Many large vehicles have air-operated parking brakes (sometimes also referred to as safety brakes). Examples of vehicles include tractor trailers, tour and school buses, fire trucks, ambulances, garbage trucks, heavy construction equipment and recreational vehicles. Unlike normal air brakes, which use air pressure to apply a braking force, the parking or safety brakes use air pressure to prevent the application of braking force. Most typically, a powerful spring is used to provide the braking force, and air pressure acting against the spring keeps the brake disengaged. Thus, these brakes are fail-safe, meaning that they will automatically deploy in the event of a loss of air pressure.

Air-operated parking brakes are typically manually employed by the manipulation of a button or a lever controlling one or more air valves. To disengage the parking brake, the air valve(s) is/are operated to open a path from an air source (typically one or more reservoirs charged from an air compressor) to the operating mechanism of the brake. Air pressure then disengages the brake against spring pressure. To engage the parking brake, the valve(s) is/are repositioned so that the: a) the path to the air source is closed; and b) the operating mechanism of the brake is vented.

Despite the presence of such brakes, and their fail-safe design, theft and accidental movement of large vehicles equipped with them still occurs on a disturbingly frequent basis. Major shipping companies can lose several loaded tractor trailers a month. School, transit and tour buses are stolen for joy rides, or—when the driver leaves momentarily at a rest stop—rolling out of control, resulting in serious injury or loss of life to passengers.

The accidental movements can often be attributed to operator error. Although the parking brake will automatically engage upon loss of air pressure, under normal operating conditions, the driver or other vehicle operator must manipulate the button, lever or other mechanism to vent the air pressure and allow the brakes to apply. Some ideas for automatic venting have been put forward, but often not incorporated because of the risk that brake application will occur inadvertently while the vehicle is in motion.

Theft can be particularly problematic with large vehicles, because unlike personal cars or trucks, large vehicles are frequently not locked and often left running while parked. In fact, operating requirements for many such vehicles dictate that they be left running for short stops in order to minimize engine wear, conserve fuel, power necessary equipment, etc. In some instances, vehicle access requirements will also dictate against locking the cab of the vehicle. Combined with the fact that several large vehicles do not even have ignition keys, it becomes apparent that they are ripe for the picking.

As a theft prevention mechanism, it has previously been contemplated to apply a lock externally to the operating mechanism for the parking brake, so as to lock the mechanism in the vented position. However, such devices can be unwieldy and unduly complicate authorized vehicle use. Also, their external location can facilitate tampering and removal.

SUMMARY OF THE INVENTION

In view of the foregoing, it is an object of the present invention to provide an improved safety system for air-operated parking brakes. According to an embodiment of the present invention, an air brake system includes a pressurized air source for supplying pressurized air, at least one service brake connected to the pressurized air source and operable to apply braking pressure when the pressurized air is supplied thereto, and at least one service brake control valve operable to control the supply of the pressurized air to the at least one service brake. The system also includes at least one parking brake connected to the pressurized air source and operable to remove braking pressure when the pressurized air is supplied thereto, at least one parking brake control valve operable to control the supply of the pressurized air to the at least one parking brake and repositionable between an air supplying position and an air venting position, and at least one parking brake manual operator operable to reposition the at least one parking brake control valve between the air supplying and air venting positions. The air brake system is configured to control the at least one parking brake control valve to automatically remove the pressurized air from the at least one parking brake based upon at least one indication of driver absence, and prevent operation by the at least one parking brake manual operator to supply the pressurized air to the at least one parking brake without at least one indication of driver presence.

According to an aspect of the present invention, the at least one indication of driver presence includes an electronic authorization, and the air brake system further includes an electronic controller operable to receive an authorization input and generate the electronic authorization based thereon, and an input device in signal communication with the electronic controller and operable to generate the authorization input.

According to another aspect of the present invention, the at least one parking brake manual operator is normally decoupled from the at least one parking brake control valve when the at least one parking brake control valve is in the air venting position. The air brake system further includes a coupler mechanism operable to couple the at least one parking brake manual operator to the at least one parking brake control valve to allow repositioning into the air supplying position, the coupler mechanism being in signal communication with the electronic controller and operated thereby based on the electronic authorization.

According to a further aspect, the system includes a manual override mechanism operable to allow the supply of the pressurized air to the at least one parking brake without operation of the coupler mechanism by the electronic controller.

According to an additional aspect, the system further includes a driver door position sensor in signal communication with the electronic controller operable to indicate whether the driver door is open, and a driver seat sensor in signal communication with the electronic controller operable to indicate whether the driver seat is empty. The at least one indication of driver absence requires both an open indication from the driver door position sensor and an empty indication from the driver seat sensor.

According to a method aspect, a method of operating a parking brake for an air brake system includes, when the parking brake is not applied, automatically operating a parking brake control valve to apply the brake based upon at least one indication of driver absence. When the parking brake is applied, release of the parking brake is prevented until at least one indication of driver presence is received.

These and other objects, aspects and advantages of the present invention will be better appreciated in view of the drawings and their accompanying description. It will be understood, however, that that the present invention is not necessarily limited thereto.

DETAILED DESCRIPTION OF PREFERRED EMBODIMENTS

Figure 1:
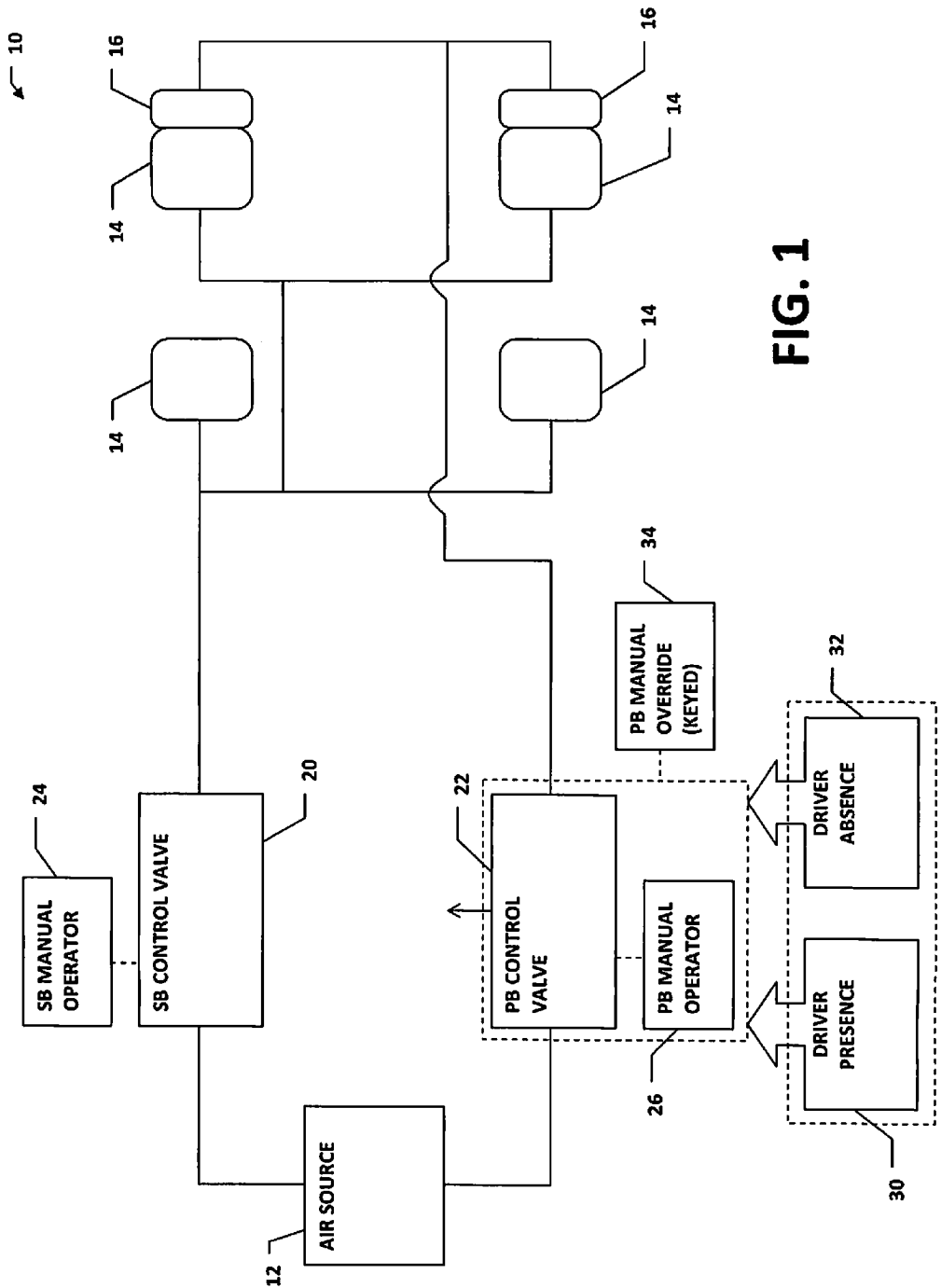
FIG. 1 is a schematic operational view of an air brake system, including a parking brake safety system, according to an embodiment of the present invention.

Referring to FIG. 1, an air brake system 10 includes a pressurized air source 12 that a supplies pressurized air to service brakes 14, and parking brakes 16. The service brakes 14 and parking brakes 16 have respective control valves 20, 22 and manual operators 24, 26. The service brakes 14 are normally not applied, and are applied only when pressurized air is supplied thereto by the service brake control valve 20 via use of its manual operator 24. The parking brakes 16 are normally applied, and are only released when pressurized air is supplied thereto by the parking brake control valve 22. Accordingly, a loss of pressurized air that would render the service brakes 14 inoperable would result in automatic application of the parking brakes 16, if not already applied.

In addition to this inherent safety feature, the operation of the parking brake control valve 22 and the parking brake manual operator 26 are affected by driver presence and absence indications 30, 32, which can be realized mechanically and/or electronically, as will be explained in greater detail below. In general, the system 10 is configured such that the parking brake control valve 22 is controlled to automatically remove pressurized air from the parking brakes 16 based upon the driver absence indication 32, and prevent operation by the parking brake manual operator 26 to supply pressurized air to the parking brakes 16 without the driver presence indication 30. A manual override 34, preferably lockable to prevent unauthorized use, is advantageously included to allow pressurized air to be supplied to the parking brake contrary to the driver presence and/or absence indications 30, 32.

Although operating along generally similar principles, there are many variations in the exact components and configurations in existing air brake systems. Accordingly, components of the air brake system 10 are depicted schematically, and it will be appreciated that the present invention can be advantageously integrated into a wide variety of air brake system implementations.

For example, the air source 12 essentially represents a supply of pressurized air, but in different embodiments can include one or more air compressors, regulators, air dryers, storage tanks, distribution valves and the like. Likewise, different designs of control valves 20, 22 and operators 24, 26 can be employed for the service and parking brakes 14, 16. For instance, the service brake control valve 20 can include a master control valve and one or more relay valves operated thereby. Manual operators 24, 26 can different types of hand and/or foot operators, such as pedals, levers, push buttons and the like. The valves themselves, and the operative link between valves and operators, can be electrical or mechanical. Mechanical operations can be achieved via physical linkages, pneumatic and/or hydraulic lines—to give a few examples.

Figure 2:
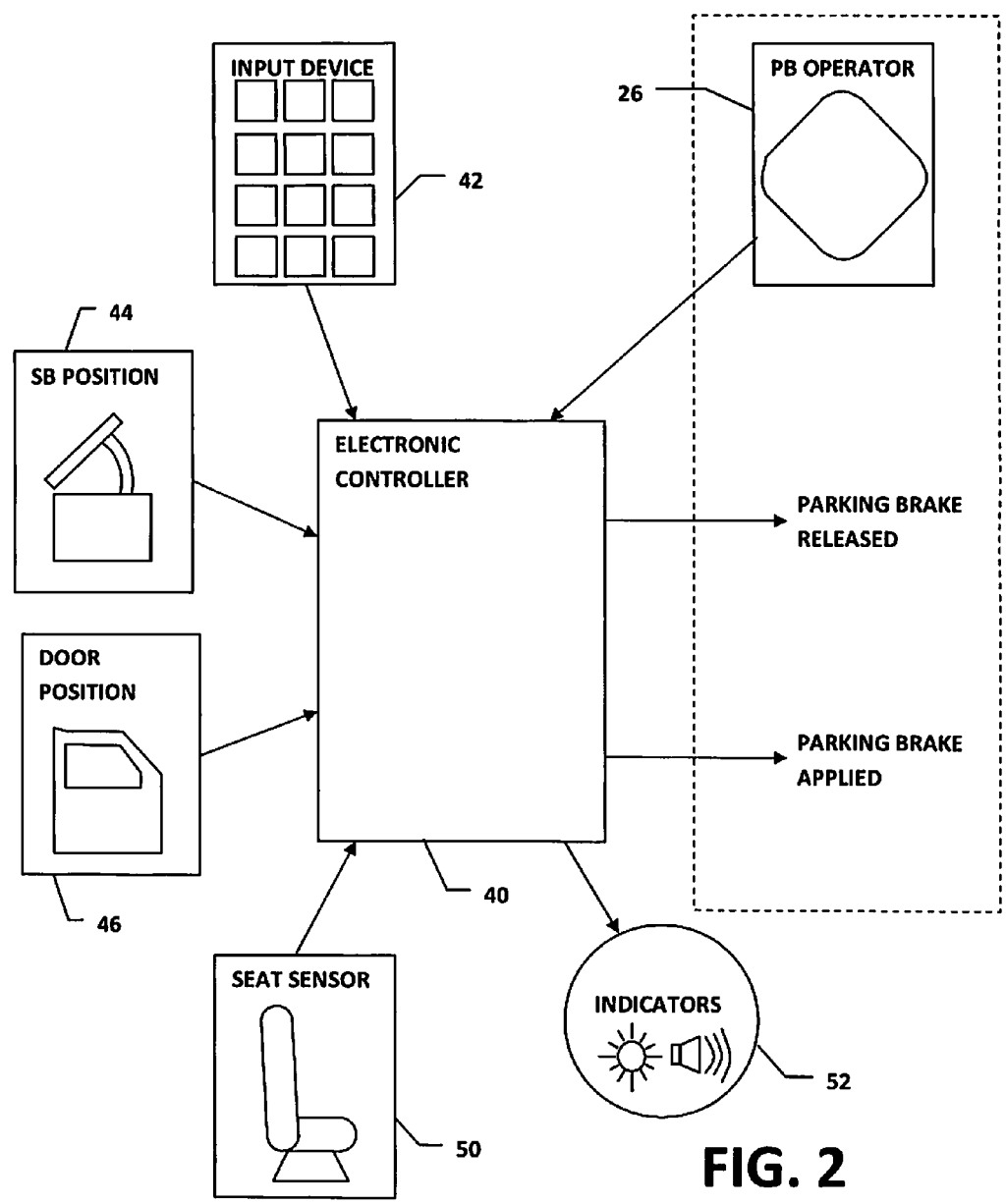
FIG. 2 is a schematic operational view of components of the parking brake safety system of FIG. 1.

Referring to FIG. 2, while a completely mechanical system of interlocks could be envisioned with the scope of the present invention for effecting the driver presence and absence indications 30, 32, advantageously one or more electronic controllers 40 are used to determine presence or absence and generate control outputs based thereon. As used herein, an "electronic controller" refers generically to a hardware device having at least one processor and memory media. The electronic controller is operable to receive input signals, process said signals based upon instructions/data stored in memory, and generate (or not generate) appropriate outputs.

In a mechanically simple embodiment, the parking brake control valve 22 can be operated electronically (e.g., a solenoid-operated valve could be used) based on control signals from the electronic controller 40. Alternately, the electronic controller 40 could indirectly effect and/or prevent operation by other means, with further examples of this being given below. In the former case, even the parking brake manual operator 26 could simply generate an electrical signal which would act as another control input to the electronic controller 40.

Other electronic controller 40 inputs could include an input device 42, a service brake position sensor 44, a driver's door position sensor 46, and a driver's seat sensor 50. The input device 42 could include a keypad, a biometric scanner, a radio frequency identification (RFID) reader, wireless receiver or similar mechanism for receiving an authorization input. Varying sensor types could be used for the sensors 44-50, such as contact sensors, proximity sensors, pressure switches, etc. The electronic controller 40 can also drive audio and/or visual indicators, such as lights, buzzers, displays, and the like.

The input device 42 and/or service brake position 44 advantageously serve as driver presence indications 30. In an advantageous configuration, the electronic controller 40 is configured to generate an electronic authorization allowing release of the parking brakes 16 only upon receiving a correct authorization input from the input device 42 (such as entry of a correct code), as well as an indication that the service brakes 14 are applied.

In an exemplary implementation, a driver enters the vehicle with the parking brakes 16 applied. Use of the manual operator 26, alone, will not allow release of the parking brakes 16.

Instead, the driver must enter a correct code via the input device 42, at which time the electronic controller 40 will generate an audible and/or visual indication via indicator(s) 52 for a predetermined period of time—preferably less than 10 seconds, and more preferably about 5 seconds. During this time, the driver can release the parking brakes 16 by manipulating the manual operator 26 (or alternately by both applying the service brakes 44 and manipulating the manual operator 26). The limited time period is established so that an open authorization does not allow release of the parking brakes 16 indefinitely.

The driver's door position sensor and seat sensor 46, 50 advantageously provide the driver absence indication 32. If the electronic controller 40 receives signals indicating that both the driver's seat is unoccupied and the driver's door is open, then the electronic controller 40 will act so as to automatically apply the parking brakes 16. By requiring two independent absence indications 32, the risk of a potentially dangerous unwanted parking brake application is greatly reduced. To further reduce risk, a predetermined duration can be set through which both absence indications 32 must be received (e.g., one second) to further reduce the likelihood of brake application due to spurious or transitory indications. A warning indicator 52 could also be generated that parking brake 16 actuation was imminent.

Figure 3:
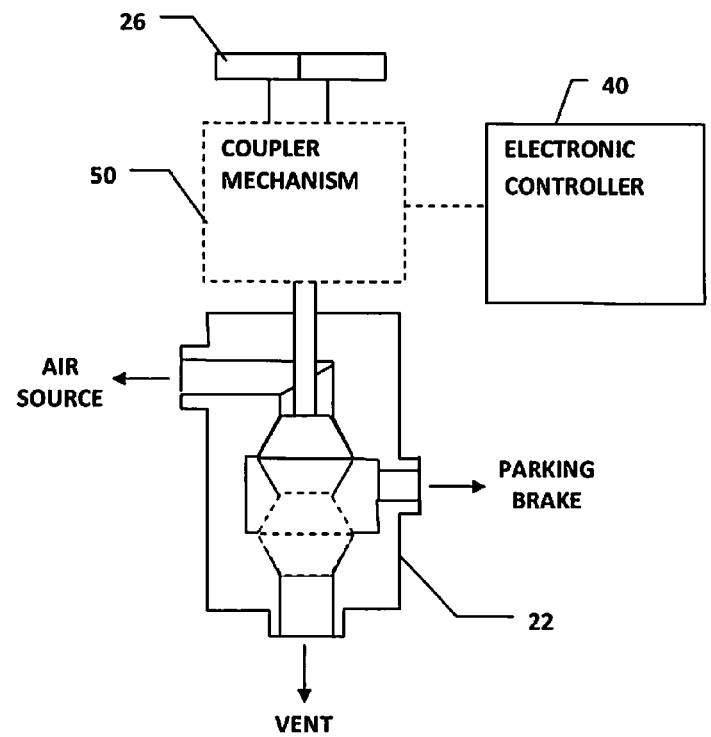
FIG. 3 is a schematic operational view of a parking brake manual operator and control valve of the parking brake safety system of FIG. 1, joined by a coupler mechanism, according to an aspect of the present invention.

As discussed above, various control functions of the system 10 can be realized mechanically, or via the electronic controller 40 indirectly acting on the parking brake control valve 22. Referring to FIG. 3, the parking brake control valve 22 is linked to the manual operator 26 via a coupler mechanism 50. The parking brake control valve 22 is repositionable between air supplying position, where pressurized air from the pressurized air source 12 (via a port labeled "air source") is supplied to the parking brakes 16 (via the port labeled "parking brake"), and an air venting position, where pressurized air is vented from the parking brakes (via the port labeled "vent"). While there are differently configured control valves available for parking brakes, the valve 22 depicted in FIG. 3 is generally representative of their basic function. In FIG. 3, the valve 22 is depicted in the air venting position (i.e., parking brakes applied—regardless of system air pressure). The air supplying position (i.e., parking brakes released, provided sufficient system air pressure is available) is depicted in broken lines.

The coupler mechanism 50 preferably always allows operation of the manual operator 26 to move the valve 22 into the air venting position from the air supplying position. In other words, the driver is preferably never prevented from applying the parking brakes 16. In the depicted embodiment, applying the parking brakes would involve pulling upward on the manual operator 26, although manual operator types involving other movements could readily be substituted.

The coupler mechanism 50 is configured to selectively prevent release of the parking brakes 16 by selectively coupling/de-coupling the manual operator 26 from the control valve 22—preferably under the direction of the electronic controller 40. The coupler mechanism 50 can realize this function in various ways. For example, referring to FIG. 4, respective shafts 52A, 54A of the control valve 52A and manual operator 26A are linked by an air chamber 56A, which allows relative motion between the shafts 52A, 54A when the manual operator 26A is repositioned toward the air supplying position to release the parking brakes. The electronic controller 40A operates a coupler solenoid valve 60A to pressurize the air chamber 56A. With the air chamber 56A pressurized, the control valve shaft 52A will move into the air supplying position when the manual operator shaft 54A is moved in the same direction. With the air chamber 56A vented, manual operator shaft 54A movement will not effect the desired movement of the control valve shaft 52A.

Figure 4:
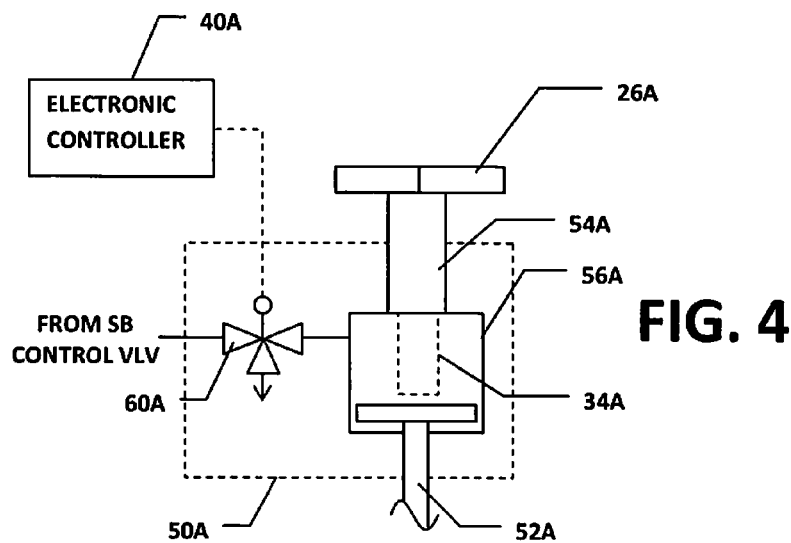
FIG. 4 is a schematic operational view of a first embodiment of the coupler mechanism of FIG. 3.

As shown in FIG. 4, the coupler mechanism 50A receives air from the air source via the service brake control valve. This configuration mechanically interlocks removal of the parking brakes 16 with application of the service brakes 14. If service brake control valve is not supply pressurized air, then operation of the coupler solenoid valve 60A by the electronic controller 40A will not pressurize the air chamber 56A.

Also depicted in FIG. 4 is a mechanism of operation for the parking brake manual override. As discussed above, the coupler mechanism preferably always allows operation of the manual operator to apply the brakes—in this scenario, the manual override mechanism is only relevant to releasing the parking brakes. In the coupler mechanism 50A, the manual override 34A includes an extendable element (shown in broken lines) that covers the gap between the control valve and operator shafts 52A, 54A. Thus, the manual override 34A eliminates the relative motion even when the air chamber 56A is not pressurized, and operatively couples shaft 52A to shaft 54A. Alternatively, the manual override could operative directly on the control valve 22, directly operate the solenoid valve 60A, or be arranged in a circuit effectively bypassing the control valve 22.

Figure 5:
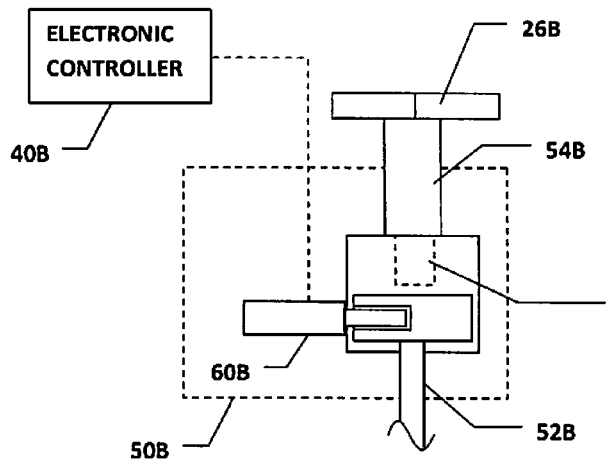
FIG. 5 is a schematic operational view of a second embodiment of the coupler mechanism of FIG. 3.

Referring to FIG. 5, in another embodiment, the coupler mechanism 50B includes a solenoid operated mechanical coupling element 60B. The mechanical coupling element 60B is advanced or retracted to physically link the parking brake control valve and manual operator shafts 52B, 54B. The element could be pneumatically advanced, in which case the interlock with the service brakes could again be realized in connection with the coupler mechanism 50B. The manual override 34B can operate in this embodiment substantially as described above. A further override variation for the coupler mechanism 50B would be a manual override that directly operated the coupling element 60B.

Figure 6:
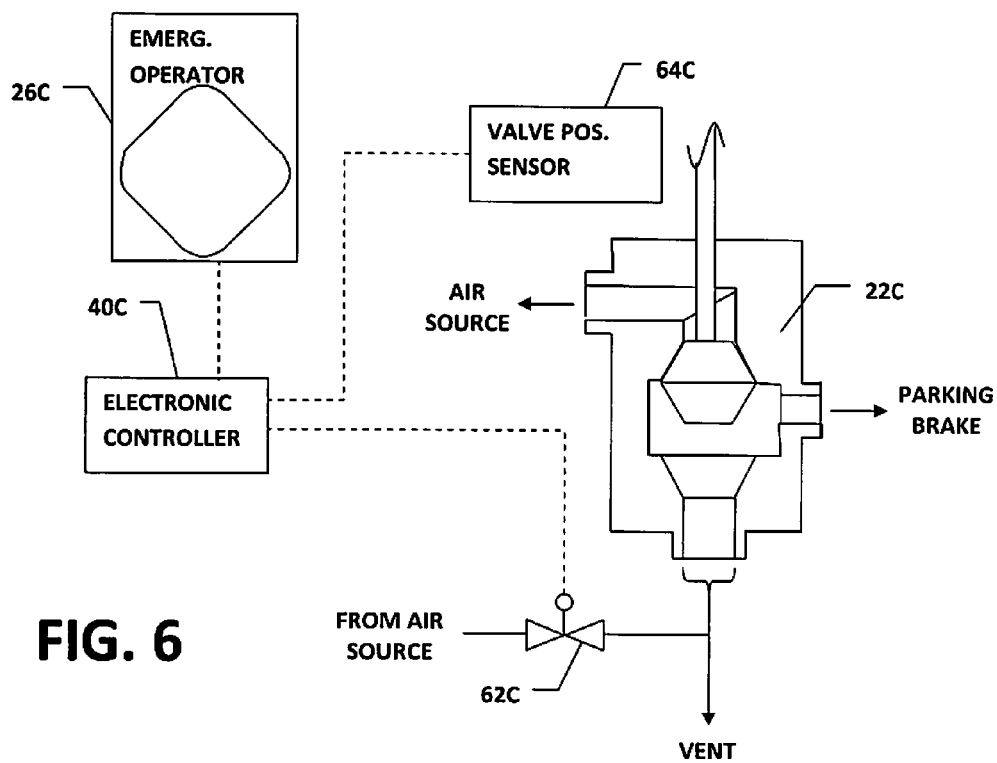
FIG. 6 is a schematic operational view of parking brake automatic actuation components for the parking brake safety system of FIG. 1, according to a further aspect of the present invention.

Referring to FIG. 6, an indirect mechanism for automatically applying the parking brakes is shown. In the depicted embodiment, the vent port of the parking brake control valve 22C is connected to the air source via an actuator solenoid valve 62C operated by the electronic controller 40C. When the electronic controller 40C determines that the drive absence indication(s) 32 are met, the actuator valve 62C is operated to port pressurized air to the vent port, automatically repositioning the control valve 22C into the air venting position. The electronic controller 40C receives an input from valve position sensor 64C to determine when the parking brake control valve 22C has been moved to the air venting position, and operates the actuator valve 62C to cut off the supply of pressurized air for the air source to avoid unnecessarily depleting stored air reserves. Alternately, or as a back-up, the actuator valve 62C could also shut after a predetermined period of time to cut off the supply of pressurized air for the air source to avoid unnecessarily depleting stored air reserves in the event of a position sensor failure.

The capability of the system 10 to automatically apply the parking brakes 16 can be used to enable further safety features. For example, a remote operator 26C can be placed in the vehicle at another location separate from the manual operator 26. The remote operator 26C can be operated at any time to direct the electronic controller 40C to apply the parking brakes via the actuator valve 62C. Preferably, the remote operator 26C is locked to prevent unauthorized or inadvertent application of the parking brakes. In an emergency scenario where the driver becomes incapacitated, but remains in the driver's seat with the door closed, another vehicle occupant (with the key or code to unlock the remote actuator) can use the remote operator 26C to apply the parking brakes 16 to bring the vehicle to a stop without the delay and additional risk involved in unbuckling and trying to reach the manual operator 26.

From the foregoing, it will be appreciated that the present invention augments air brake systems addresses both safety problems stemming from failures to apply parking brakes and theft issues endemic to many air-brake equipped vehicles. In general, the foregoing description is provided for exemplary and illustrative purposes; the present invention is not necessarily limited thereto. Rather, those skilled in the art will appreciate that additional modifications, as well as adaptations for particular circumstances, will fall within the scope of the invention as herein shown and described and the claims appended hereto.

What is claimed is:

1. An air brake system comprising:
    a pressurized air source for supplying pressurized air;
    at least one service brake connected to the pressurized air source and operable to apply braking pressure when the pressurized air is supplied thereto;
    at least one service brake control valve operable to control the supply of the pressurized air to the at least one service brake;
    at least one parking brake connected to the pressurized air source and operable to remove braking pressure when the pressurized air is supplied thereto;
    at least one parking brake control valve operable to control the supply of the pressurized air to the at least one parking brake and repositionable between an air supplying position and an air venting position; and
    at least one parking brake manual operator operable to reposition the at least one parking brake control valve between the air supplying and air venting positions;
    wherein the air brake system is configured to control the at least one parking brake control valve to:
        automatically remove the pressurized air from the at least one parking brake based upon at least one indication of driver absence; and
        prevent operation by the at least one parking brake manual operator to supply the pressurized air to the at least one parking brake without at least one indication of driver presence;
    wherein the at least one parking brake manual operator is normally decoupled from the at least one parking brake control valve when the at least one parking brake control valve is in the air venting position, and the air brake system further comprises:
        a coupler mechanism operable to couple the at least one parking brake manual operator to the at least one parking brake control valve to allow repositioning into the air supplying position.

2. The air brake system of claim of claim 1, wherein the at least one indication of driver presence includes an electronic authorization, and the air brake system further comprises:
    an electronic controller operable to receive an authorization input and generate the electronic authorization based thereon; and
    an input device in signal communication with the electronic controller and operable to generate the authorization input.

3. The air brake system of claim 2, wherein the input device includes a keypad.

4. The air brake system of claim 2, wherein
    the coupler mechanism is in signal communication with the electronic controller and operated thereby based on the electronic authorization.

5. The air brake system of claim 4, wherein the electronic controller only operates the coupler mechanism for a predetermined time period after generating the electronic authorization.

6. The air brake system of claim 5, wherein the predetermined time period is less than ten seconds.

7. The air brake system of claim 5, further comprising an indicator mechanism in signal communication with the electronic controller and operable thereby, the electronic controller operating the indicator mechanism during the predetermined time period.

8. The air brake system of claim 7, wherein the indicator mechanism generates an audible tone.

9. The air brake system of claim 4, further comprising a manual override mechanism operable to allow the supply of the pressurized air to the at least one parking brake without operation of the coupler mechanism by the electronic controller.

10. The air brake system of claim 9, wherein the manual override mechanism includes a keyed lock that must be unlocked before operation.

11. The air brake system of claim 2, wherein the at least one indication of driver presence also includes operation of the at least one service brake control valve.

12. The air brake system of claim 2, further comprising:
    a driver door position sensor in signal communication with the electronic controller operable to indicate whether the driver door is open; and
    a driver seat sensor in signal communication with the electronic controller operable to indicate whether the driver seat is empty;
    wherein the at least one indication of driver absence requires both an open indication from the driver door position sensor and an empty indication from the driver seat sensor.

13. The air brake system of claim 12, further comprising a parking brake actuation mechanism in signal communication with the electronic controller and operable thereby to place the at least one parking brake control valve in the air venting position.

14. The air brake system of claim 13, wherein the parking brake actuation mechanism includes an actuator solenoid valve connected to the pressurized air source and operable to port the pressurized air to a vent port of the at least one parking brake control valve to reposition the at least one parking brake control valve into the air venting position.

15. The air brake system of claim 14, wherein the electronic controller closes the actuator solenoid valve after sensing that the parking brake control valve has been repositioned into the air venting position.

16. The air brake system of claim 13, further comprising a remote operator operable to direct the electronic controller to place the at least one parking brake control valve in the air venting position independently of the driver absence indication.

17. The air brake system of claim 1, wherein the coupler mechanism includes a solenoid operated mechanical coupling element movable to couple the at least one parking brake manual operator and the least one parking brake control valve.

18. The air brake system of claim 1, wherein an air chamber is formed between respective control surfaces of the at least one parking brake manual operator and the at least one parking brake control valve, and the coupler mechanism includes a coupler solenoid valve operable to port the pressurized air into the air chamber.

19. The air brake system of claim 18, wherein the coupler solenoid valve receives the pressurized air from the at least one service brake control valve, such that the at least one service brake control valve must be supplying the pressurized air to the at least one service brake for the pressurized air to also be ported into the air chamber.

* * * * *